June 22, 1971 W. BALLE 3,585,686
APPARATUS FOR RENEWING THE CIRCULAR SHAPE OF VEHICLE TIRES
Filed Aug. 12, 1969 8 Sheets-Sheet 4

Inventor
Walter Balle
By
Watson Cole, Grindle & Watson
Attys

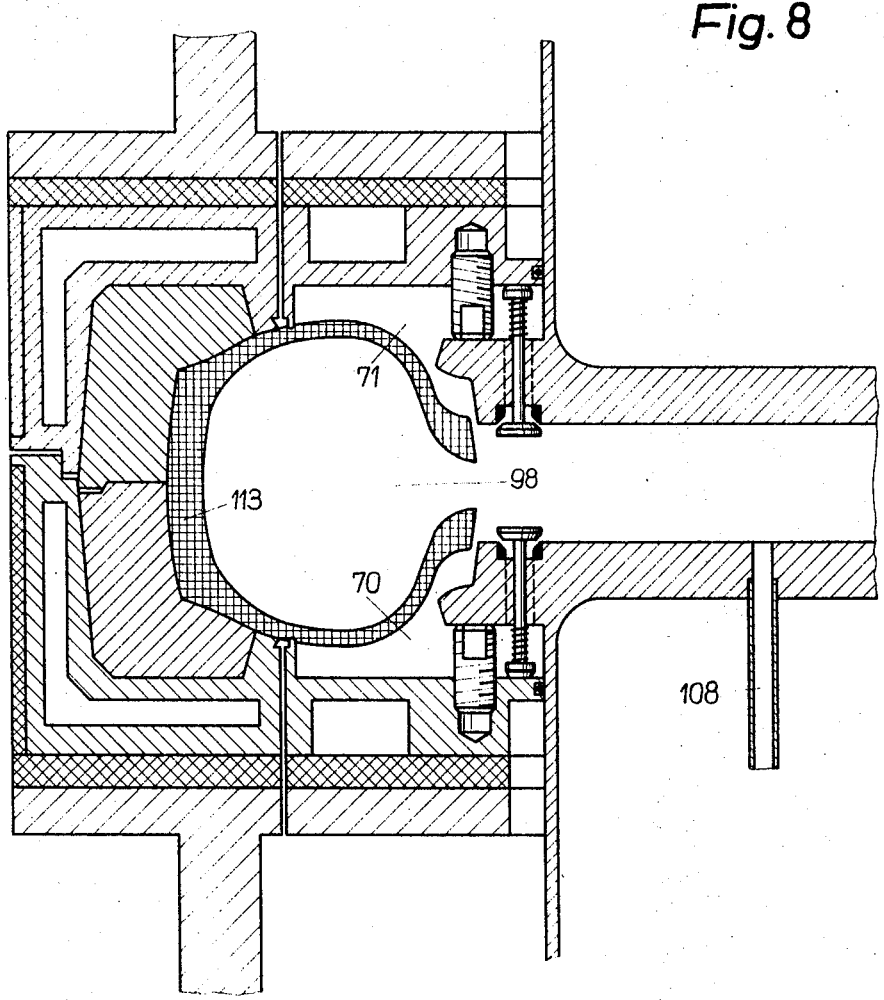

United States Patent Office 3,585,686
Patented June 22, 1971

3,585,686
APPARATUS FOR RENEWING THE CIRCULAR SHAPE OF VEHICLE TIRES
Walter Balle, Dornigheim, Germany, assignor to Firma Leonhard Herbert Maschinenfabrik
Filed Aug. 12, 1969, Ser. No. 849,413
Int. Cl. B29h 5/04
U.S. Cl. 18—18F       16 Claims

ABSTRACT OF THE DISCLOSURE

Apparatus for renewing the circular shape of vehicle tires in a divided vulcanizing mold which lies against the tire essentially only in the area of the tread of the tire.

---

Figure 1:
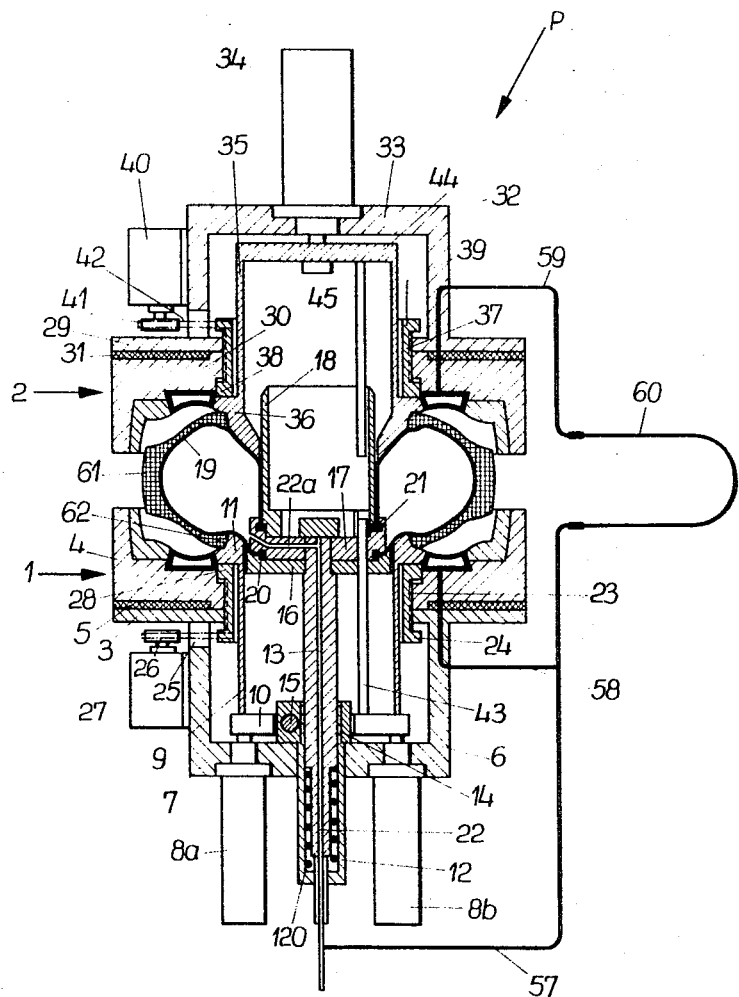

This invention relates to an apparatus for renewing the circular shape of vehicle tires in a divided vulcanizing mold which lies against the tire essentially only in the area of its tread.

A large portion of a vehicle tire is, after the rubber layer is substantially worn off, provided with a new layer of rubber. This process is called recapping, and when recapping the tire is first peeled, that is, the old rubber layer is substantially removed. Then a layer of crude rubber is applied and this crude rubber layer is shaped in a vulcanizing mold, that is provided with a tread profile and vulcanized by heating in the mold.

Used tires that are to be recapped are delivered in various sizes. A sorting according to the naminal dimension and also according to rim diameter and width is of course easy, (a current tire size is for example 8.00–41), but in the various tires having the same nominal dimensions (rim diameter times width), the so-called bead-to-bead measurements differ, that is the external circumference of the radial tire cross section measured from bead-to-bead. The problem therefore exists to choose the vulcanizing mold according to the different bead-to-bead measurements.

There are two different methods of recapping of which one is primarily used in the United States and the second primarily in Europe, especially Germany.

According to the first method vulcanizing molds are used only that lie against a part of the external circumference of the tire, namely in the area of the tread and in a relatively small area adjoining the tread. These vulcanizing molds are not built into a press and can naturally vulcanize a tire only over a part of its surface. The pressing of the tire against the mold takes place by means of a tube placed manually in the interior of the tire, which tube when inflated braces itself on the one hand in the area of the inside wall of the tire that is opposed to the mold and on the other hand against a collapsible rigid tube support ring present in the tire cavity and introduced by hand. Because of the necessity of introducing a tube and a tube support ring into the interior of the tire, automation is not possible or anyway only with great technical expenditure. After introducing the tube and support ring and inflating the tube, the mold is for the purpose of vulcanizing the tire, introduced into a heating device. The method described has the advantage that tires with relatively large mutual differences is bead-to-bead measurement can be vulcanized in a mold of a given size, which is possible because the sidewalls of the tire and the beads are unencumbered. In the case of a tire with large bead-to-bead measurement the beads will, as a result of the tension in the tire, approach each other somewhat and in a tire with small bead-to-bead measurement, they will move apart from each other.

According to the second method so-called complete molds are used which preferably are built into a press. These complete molds lie against the entire exterior surface of the tire so that with complete molds a renewing of the circular shape from bead-to-bead is possible. A disadvantage of the complete molds is that only minor deviations from a predetermined bead-to-bead measurement can be permitted, as of course the entire external surface of the tire must lie against the mold. A much more accurate sorting of the tires is therefore necessary, and more molds are used than with the first method. An advantage of the use of complete molds built into a press is that manual work in introducing the tire into the mold and in closing the mold is avoided because the press handles these operations automatically.

The invention has for an object thereof to create an apparatus in the use of which the advantages of the first method are combined with the advantages of the second method, which also permits the automatic introduction of the tire in the mold whereby the advantage will be retained, however, that with one mold of a given size, tires can be vulcanized whose bead-to-bead measurements differ rather widely from each other. For the solution of this problem the invention is based on an apparatus for recapping vehicle tires with a divided vulcanizing mold which lies against the tire essentially only in the area of the tread and comprises in that the vulcanizing mold is built into a tire heating press in which the mold parts are removable from each other and which has a device for supplying to the interior of the tire a pressure medium pressing the tire against the mold, and that in the mold in the area of the sidewalls of the tire, cavities are provided into which a pressure medium can be introduced.

The building in of the mold in a tire heating press permits automation because in tire heating presses, automatically operating devices are provided for closing the mold and for introducing a pressure medium. Therefore it is not necessary to perform heavy manual work to accomplish this. The apparatus according to the invention also permits the vulcanization in a given mold, of tires with relatively widely differing bear-to-bead measurements and this is accomplished by the support according to the invention, of the sidewalls of the tires by means of a pressure medium that is introduced into the said pressure medium and the latter gives the tire sidewalls a resilient support. In the case of a tire with large bead-to-bead measurements, the sidewalls can curve out into the cavities. In spite of the high interior pressure in the tire that is required for satisfactory vulcanization, harmful expansion of tire sidewalls is thus avoided because of the latter can be supported by a pressure medium. It is possible as well to maintain the same pressure and in the interior of the tire, or instead to keep the pressure somewhat lower in the cavities, than in the interior of the tire whereby the pressure difference is not greater than the pressure difference that a tire must sustain anyway during operation and which therefore cannot produce harmful expansion.

Figure 2:
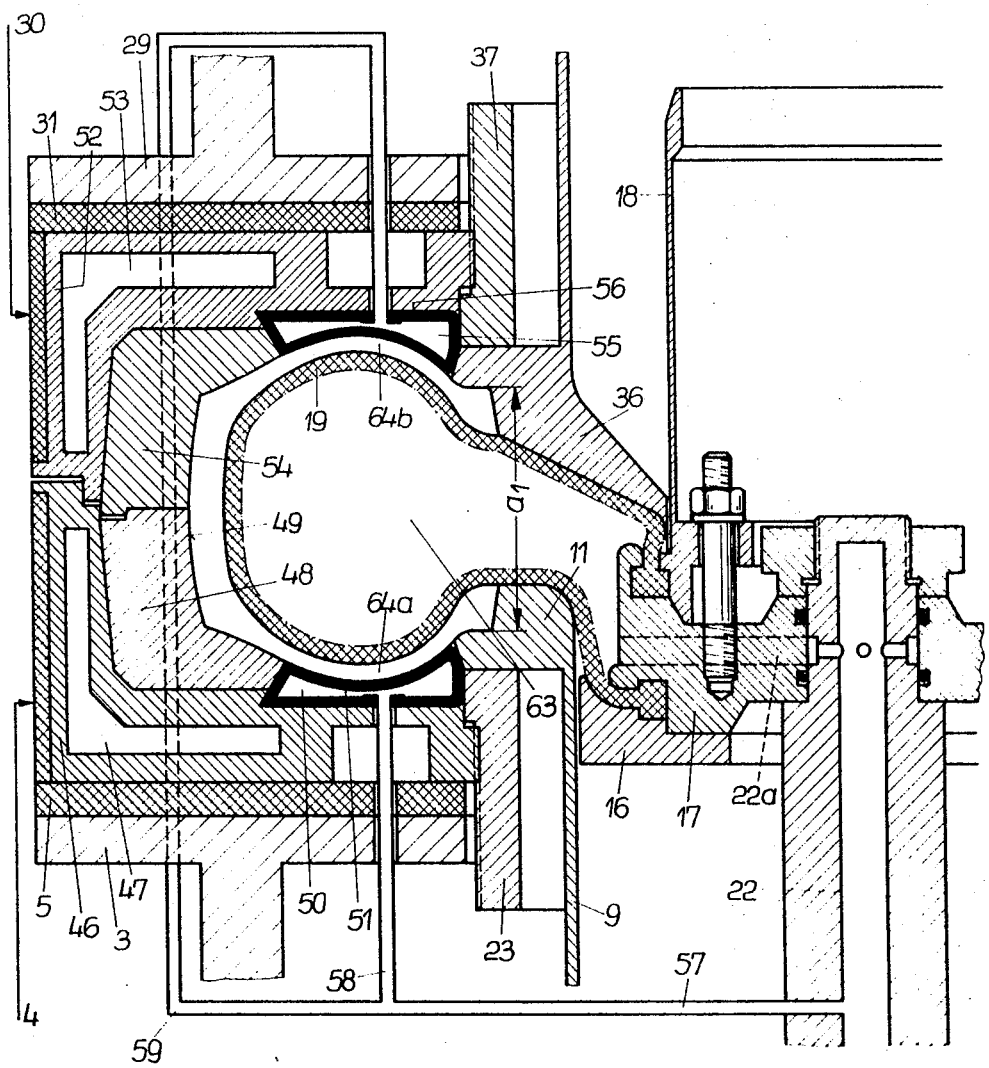
Figure 3:
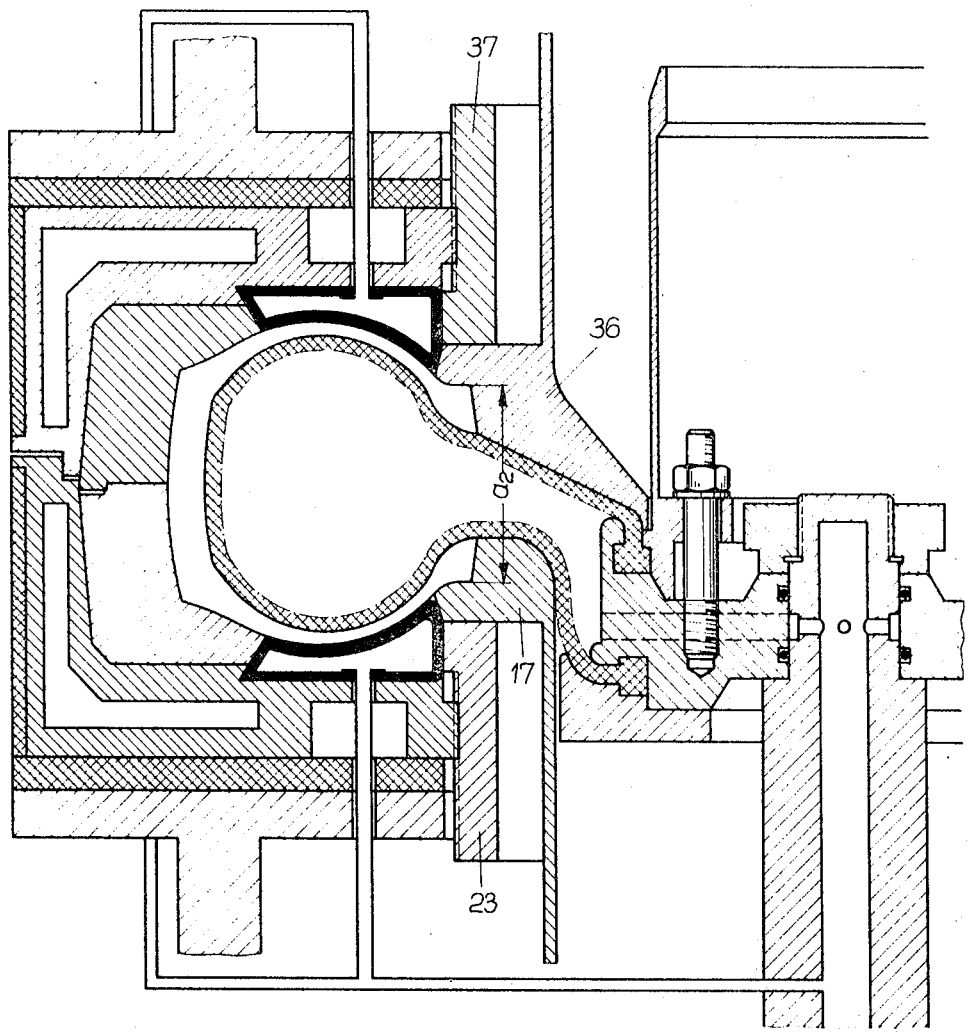
Figure 4:
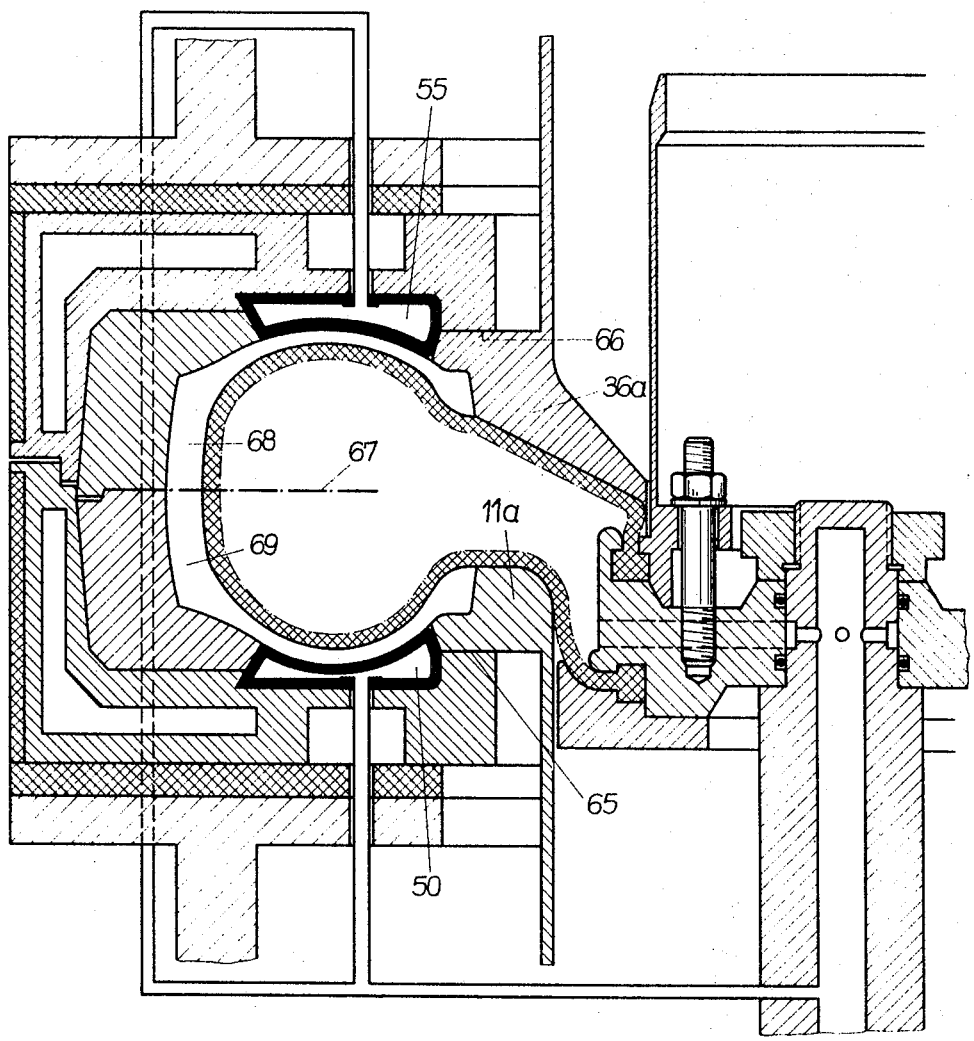
Figure 5:
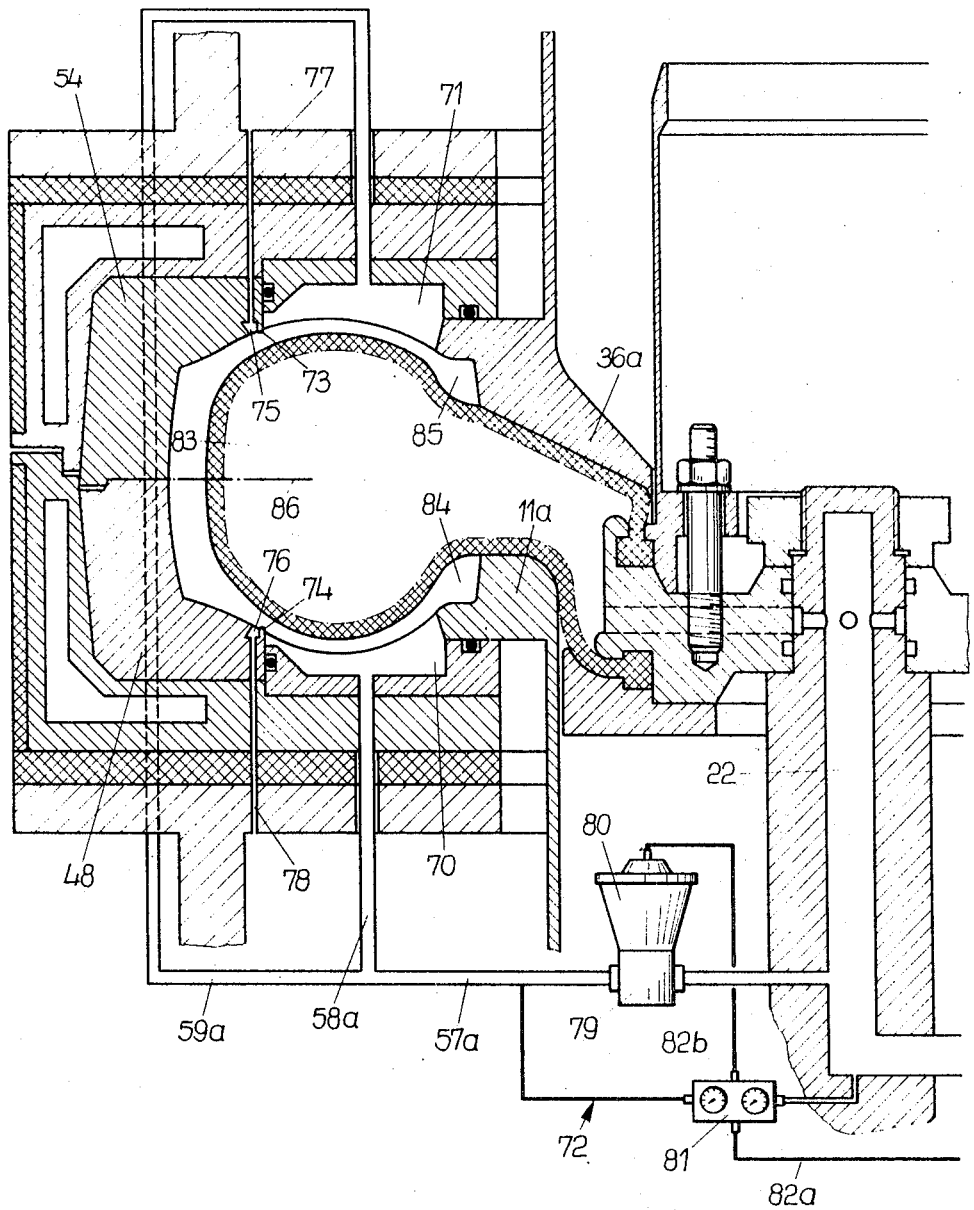
Figure 6:
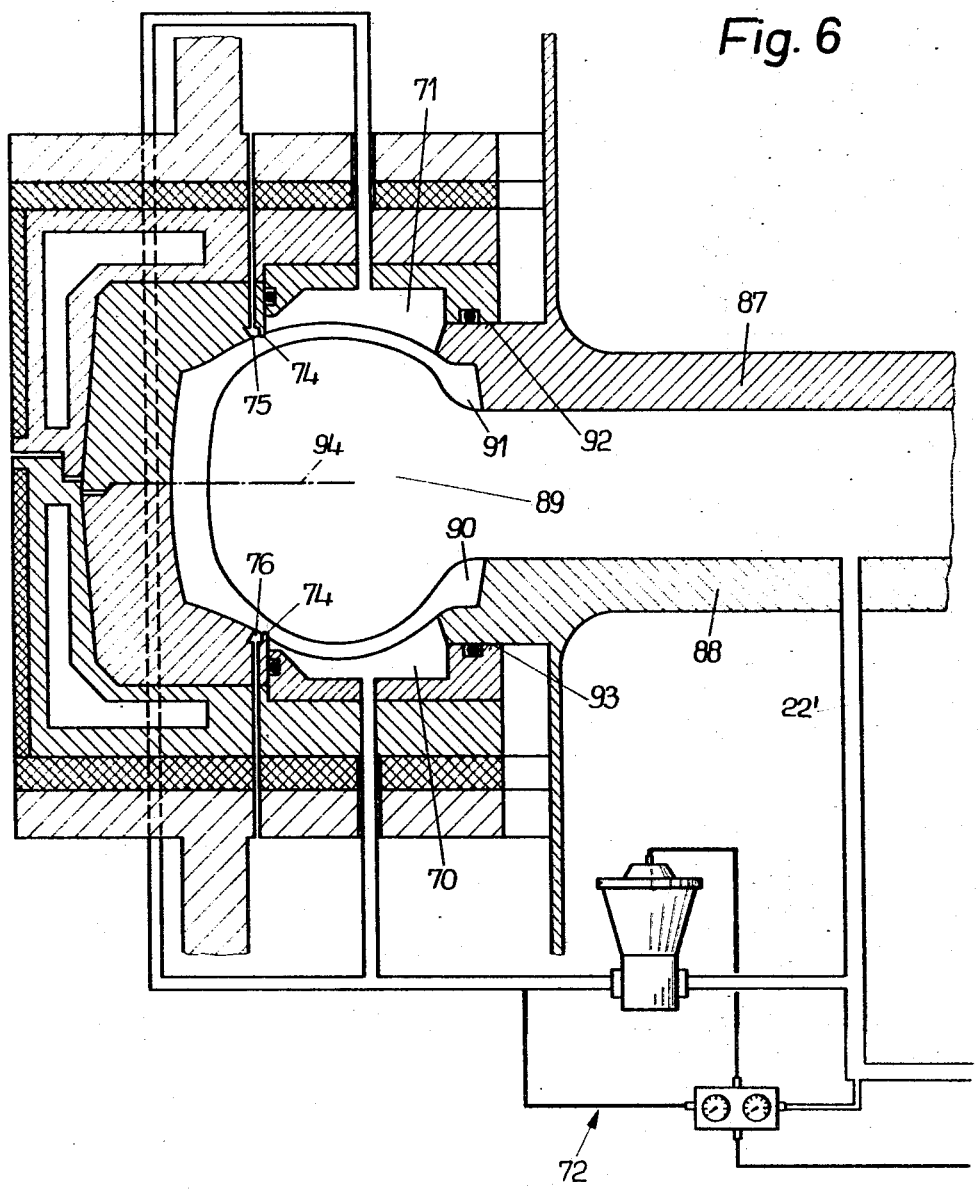
Figure 7:
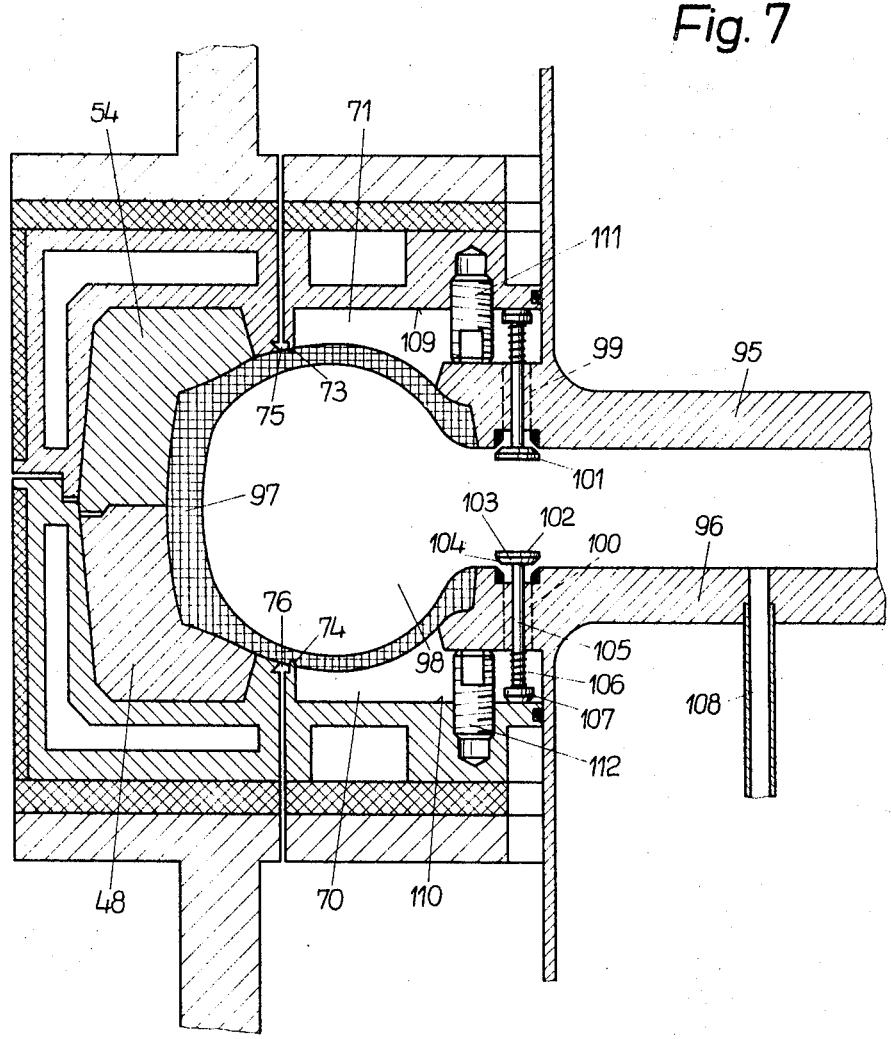

Further objects of the invention will be apparent from the following description when considered in connection with the accompanying drawings in which:

FIG. 1 is a cross-section of a first embodiment of the invention, in which a press with curing bag is used which is not yet entirely closed, FIG. 2 is a cross-section of an enlarged section of FIG. 1, in which the press is however in closed position, FIG. 3 is a cross-section corresponding to FIG. 2, but where a tire with large bead-to-bead measurement is introduced as in FIG. 1, FIG. 4 is a partial cross-sectional through a second embodiment wherein, as distinguished from the embodiment according to FIGS. 1 to 3, the bead seating rings are at an unalterable distance from each other in the vulcanizing position in the press, FIG. 5 is a cross-section of a further embodiment of the invention in which, as distinguished from the embodiments described, the cavities are open toward the side walls of the tire, FIG. 6 is a cross-section of a fourth embodiment in which the press is used without curing bag, FIG. 7 is a partial cross-section through a fifth embodiment of the invention in which the interior of the tire can be connected with the cavities by means of valves placed at the bead seating rings, and FIG. 8 is a cross-section corresponding to FIG. 7, but showing the vulcanizing of a tire with larger bead-to-bead measurement.

The press illustrated schematically in FIG. 1, designated as a whole by a whole by P, has a bottom 1 and a top parts 2, all three indicated by arrows. The bottom part 1 is stationary and the top part 2 is movable in the vertical direction relative to the bottom part 1 by means of a moving device that is not specifically shown. According to FIG. 1 the top part 2 is lifted up somewhat from the bottom part 1 but a substantially greater lift height of the top par 2 can be produced however.

The bottom part 1 of the press has a table 3 on which the bottom part 4 of the mold is mounted over a heat insulating intermediate layer 5. From the press table 3 there extends a wall 6 downwardly, which serves as mounting support of a floor 7 at a distance from the press table 3. Cylinders 8a and 8b for a pressure medium are attached to the floor 7.

The pressure medium cylinders 8a and 8b serve for the vertical displacement of a cylinder 9 on which the piston rods of the pressure cylinders 8a and 8b act by means of a plate 10. The cylinder 9 supports at its upper end a bead seating ring 11.

There is furthermore attached in the bottom 7, a sleeve 12 which surrounds the lower end of a rod 13. A compression spring 120 acts on the rod 13, the said spring 120 being braced with its upper end in a shoulder in rod 13 and with its lower end on the bottom of sleeve 12. The rod 13 passes through a clamping device 14, which is fixedly disposed in relation to the bottom 7 and by means of a clamping bolt 15 can be operated so that it can clamp the rod 13 in any position.

At the upper end of rod 13, two plates 16 and 17 as well as the bag guide cylinder 18, are attached. A curing bag 19 is clamped with its lower reinforced edge 20 between the plates 16 and 17 and which its upper reinforced edge 21 between plate 17 and the cylinder 18.

Through the rod 13 were extends a supply pipe 22, which is connected with the interior of the curing bag 19 through pipe 22a.

At the bottom part 1 of the press there is furthermore a ring 23 which is screwed by means of external threads into a corresponding thread on the bottom part 4 of the mold. A rim 24 at its lower edge is provided with a sprocket wheel on which a chain 25 is provided which latter, is driven by means of a sprocket wheel 26 that is mounted on the drive shaft of an electric motor 27. The ring 23 has at its upper end, a flange 28 by which it lies against the underside of the bead seating ring 11.

The top part 2 of the press has a plate 29 to which the top part 30 of the mold is attached by means of a heat insulating intermediate layer 31. From the plate 29 a wall 32 extends upward, serving to hold a cover plate 33 at a distance from the plate 29. On the cover plate 33 there is a pressure cylinder 34 with whose piston rod, a cylinder 35 is connected. The cylinder 35 carries an upper bead seating ring 36 at its lower edge.

Also on the top part 2 of the press there is a ring 37 provided with threads, which ring is screwed into threads on the top part 30 of the mold and which presses with a lower flange 38 against the upper bead seating ring 36. At the upper edge of the ring there is a sprocket wheel 39, which is driven by means of a chain 42 from an electric motor 40 that has a sprocket wheel 41 on its drive shaft.

A lower stop rod 43 extends upwards from the plate 10 in the bottom part of the press and an upper stop rod 45 extends downwards from the plate 44 forming the upper bottom of the cylinder 35. The stop rods 43 and 45 are in alignment with each other and can touch each other with their faces.

The functions of the mold parts 4 and 30 will be considered more specifically in the following with reference to FIG. 2 of the drawings.

The bottom part 4 of the mold has a shell-shaped part 46, which presents a cavity 47 into which a heating medium, that is, steam, can be introduced. The shell-shaped part 46 accommodates a mold ring 48 on whose inner side 49 the patterns are formed that are impressed in the tire to give it the desired configuration.

According to the invention a cavity 50 is provided in the bottom part of the mold which connects with the edge of the mold ring 48 and extends to the bead seating ring 11. This cavity is in the embodiment under consideration lined with a flexible and stretchable tubular element 51.

The top part 30 of the mold is similarly constructed, in that it also has a shell-shaped part 52 with a cavity 53 as well as a mold ring 54 and according to the invention a cavity 55 which is lined with a tubular element 56.

As FIGS. 1 and 2 show the supply pipe 22 is tapped and connected by a pipe 57 which connects pipe 22 by means of branches 58 and 59 with the cavities 50 and 55. As shown in FIG. 1, there is in branch 59 a flexible connection 60, which permits the top part 2 of the press to be moved in relation to the bottom part 1 of the press.

The press described in the foregoing operates as follows.

Let it be assumed that the preceding vlucanizing period has been terminated and the vulcanized tire has already been removed from the press. In this case the elements of the bottom part of the press are in the following position: The cylinders 8a and 8b are under pressure and have driven the cylinder 9 so far upward that the bag 19 has almost completely disappeared in the narrow annular space between the cylinder 9 and the bag guide cylinder 18. A tire 61 that is to be vulcanized is now placed with one of its beads 62 on the lower bead seating ring 11 which has been moved far out.

Now the downward movement of the top part 2 of the press begins and simultaneously with this downward movement, the upper bead seating ring 36 is moved downward in relation to the top part 2 of the press by means of the pressure cylinder 34. Hereby the upper bead seating ring 36 slides along the bag guiding cylinder 18 and finally engages the upper tire bead. The top part 2 of the press now moves further downward until the rods 45 and 43, contact each other and from then on the upper rod 45 pushes cylinder 9 ahead. This is possible because the upper pressure cylinder 34 develops greater power than the two lower pressure cylinders 8a and 8b together. In the downward movement of the cylinder 9 the latter slides along the bag 19. The bag is guided by the conical surface on the upper bead seating ring 36 into the interior of the tire. When the curing bag 19 has been largely entered into the tire, some pressure (preliminary inflation pressure) is introduced through pressure supply pipe 22 into the bag so that it applies itself to the interior wall of the tire. The curing bag is completely entered into the tire when the top half of the mold lies against the bottom half.

Simultaneously with the introduction of pressure medium into the tire cavity, pressure is also introduced into the cavities 50 and 55 so that no pressure difference can build up between the interior of the tire and the cavities 50 and 55. The sidewalls 64a and 64b therefore are not subjected to any harmful stresses.

Now higher internal pressure is introduced into the curing bag 19 and the vulcanization of the tire begins. As the high internal pressure immediately builds itself up in the spaces 50 and 55, no significant pressure difference can arise between the interior 63 of the tire and the cavities 50 and 55, so that the tire sidewalls 64a and 64b can be said to be clamped between the curing bag 19 and the tubular elements 51 and 56.

The terminal position of the bead seating rings 11 and 36 is defined by abutment against the front edges of the rings 23 and 37 and these rings are by means of the electric motors 27 and 40 adjusted in accordance with the bead-to-bead measurement of the tire that is to be vulcanized. In FIG. 2, the vulcanization of a tire with relatively small bead-to-bead measurement is represented and the distance between the bead seats is in this case $a_1$. In FIG. 3, the vulcanization of a tire with larger bead-to-bead measurement is represented. From the drawing it will be perceived that rings 23 and 37 have been screwed so that they approach each other. Hereby the bead seating rings 11 and 36 in the vulcanizing position are also at a distance shorter from each other, namely the distance $a_2$. This adjustment of the rings 23 and 37 and therewith also of the bead seating rings 11 and 36, can take place for hours and that in accordance with the sorting of the tires. It is also possible to control the distance by means of a punchcard belonging to each tire, which cards are fed into a control device for the control of the electric motors 27 and 40.

From the drawing, it is clear that the resilient support of the tire sidewalls 64a and 64b takes place by the tubular elements 51 and 56, respectively, the pressure medium contained in the cavities 50 and 55 allowing a large degree of adjustment of the tire to the mold, so that harmful bulging of the tire sidewalls cannot occur.

After the vulcanization is finished the top part 2 of the press is first lifted whereby it detaches itself from the upper part of the tire 61, thereby the upper bead seating ring 36 can be controlled so that it holds down the tire so it cannot be carried along with the top part of the mold. Subsequently cylinder 9 functioning as an ejector, is lifted and thereby breaks the vulcanized tire out of the bottom part 4 of the mold. The tire is then removed manually or by means of an automatic device, not shown, from the lower bead seating ring 11, whereupon a new tire is put in place to be vulcanized. The clamping device 14 and 15 and with it the position of the bag in relation to the bottom part of the press remains unchanged as long as tires of the same size are to be processed. If a tire of another size, that is, with another internal circumference is to be processed, the rod 13 is clamped at another point so that the initial position of the bag is different from before. For such an adjustment of the press the clamping device 14 is loosened prior to closing, whereupon the spring 120 forces the rod 13 upward. When the press is closed, the elements 16, 17 and 18, clamp the edges 20 and 21 of the bag 19 and are brought into the correct position in relation to the tire 61 by the bead seating ring 36. The clamping device 14 is then again tightened, whereupon the bag 19 is adjusted to the new tire size.

The embodiment of FIG. 4 differs from the embodiment of FIGS. 1 to 3 in that instead of bead seating rings 11 and 36, whose final position which they assume when the press is closed, being changeable, namely by appropriate adjustment of rings 23 and 37, bead seating rings 11a and 36a are used, whose final position is defined by abutment against fixed stops. The distance between the bead seating rings is therefore always the same independent of the tire size, and the differences in bead-to-bead measurement are in this case absorbed by the resilient support by the pressure medium contained in the cavities 50 and 55.

FIG. 4 shows above the dashed line 67, a half tire with small bead-to-bead measurement and below the dashed line 67, a half tire 69 with large bead-to-bead measurement. From the drawing it is clearly perceived that the sidewall of the larger tire 69 bulges farther into the cavity 50 then the smaller tire 68 into cavity 55.

The embodiment of FIG. 5 differs from the embodiment of FIG. 4 in that cavities 70 and 71 corresponding to cavities 50 and 55, are open toward the tire sidewalls thus not closed by tubular elements, and in that a pressure reducing element designated as a whole by 72 is provided.

As the cavities 70 and 71 are no longer closed but are to be closed only through the interaction with the tire, special means are needed in order to achieve an adequate seal at the tire. These means consist of rounded edges 73 and 74 running around the entire mold and relief grooves 75 and 76 adjacent to these edges. The relief grooves 75 and 76 are connected through channels 77 or 78 with the atmosphere.

The pressure reducing device has a valve 79 that is equipped with a pneumatic actuating instrument 80. The valve is controlled from a control device 81 that controls the supply of actuating air by means of pipes 82a and 82b. The control device 81 first measures the pressure prevailing in the pipe 57a and secondly the pressure prevailing in pipe 22. The control device is so adjusted that it lets into the device 80 the actuating air required for opening valve 79, as soon as the difference in pressure in pipes 22 and 57a exceeds a certain value. For example, a maximum permissible difference can be set at 1 to 2 atmospheres.

The closing procedure for the press according to FIG. 5 is essentially the same as described with reference to FIGS. 1 to 3. The difference is however, that no pressure equalization can occur between the interior 83 of the tire and the cavities 70 and 71, but the pressure in the latter are always somewhat lower than in the interior 83 of the tire. By this are attained, first, that the beads 84 and 85 of the tire are pressed by the interior excess pressure against the bead seating rings 11a and 36a and, second that the tire is firmly pressed against the rounded edges 73 and 74. Small amounts of leakage that might penetrate under the edges 73 and 74 enter into the relief grooves 75 and 76, so it is not possible for pressure to build up between the rings 48 and 54 and the tire surface to be vulcanized thus for pressure medium to leak in between the mold and tire.

In FIG. 5 the two different tire sizes are again represented, that is, above the center line 86, a half tire with small bead-to-bead measurement and below the center line 86, a half tire with large bead-to-bead measurement. Analogous to FIG. 2 the sidewall of the tire with the greater bead-to-bead measurement bulges farther into the cavity 70 than the sidewall of the smaller tire does into cavity 71.

In FIG. 6 an embodiment is shown which the press does not have any curing bag in which the vulcanization is also carried out without a tube. This press differs from the pressure hitherto described in that the bead seating rings 87 and 88 are not designed as ring-shaped bodies, but as plates that contribute to a tight closure of the interior 89 of the tire. Otherwise, this press is also equipped with a pressure reducing device 72, rounded edges 73 and 74 and relief channels 75 and 76.

When a tire is inserted into a press according to FIG. 6, the two plates 87 and 88 are brought very close together, that is, to a substantially smaller distance than that corresponding to the normal distance of the beads 90 and 91 of the tire to insure that the bead seats push against the beads. This is absolutely necessary in order to be able to seal the interior 89 of the tire against the outside. As soon as this has been accomplished a relatively low pressure is admitted through the supply pipe 22' into the interior 89 of the tire whereby first there is attained that the beads 90 and 91 push further against their bead seats and in any case no longer can remove themselves from the latter. Next the plates 87 and 88 are moved away from each other and that to a somewhat greater distance than the beads 90 and 91 have when the tire is relaxed. This facilitates the insertion of the tire into the mold and also the sealing of the tire at the rounded edges 73 and 74. The final distance of the plates 87 and 88 is then achieved by the abutment of the rings against the stop faces 92 and 93.

After closing the press the full vulcanization pressure is then applied whereby a pressure difference again results as to the device 72 as already described with reference to the embodiment according to FIG. 5. Also in FIG. 6, two half tires with different bead-to-bead measurement are represented on the two sides of the dashed line 94 whereby again the half tire drawn below the line 94 has the greater bead-to-bead measurement and its sidewall accordingly bulges deeper into the cavity 70 than the sidewall of the upper sidewall into the cavity 71.

In an embodiment according to FIGS. 7 and 8, a press without a curing bag is again used. The bead seating rings 95 and 96 are also in this case constructed as closed plates. The cavities 70 and 71 are likewise open toward the tire 97 as in the embodiment according to FIG. 6. In order to maintain the seal against the tire, rounded edges 73 and 74 as well as relief grooves 75 and 76 are again provided.

The essential difference as compared with the embodiment according to FIG. 6 consists in that the cavities 70 and 71 can be brought into direct connection with the interior 98 of the tire. This is possible through passages 99 and 100 provided in the plates 95 and 96, which can be closed by means of tappet valves 101 and 102. Each tappet valve 101 and 102 has a valve head 103 which interacts with a valve seat 104, a valve stem 105, and a valve spring 106 which support themselves on the one hand on the associated plate 95 or 96 and on the other hand on a head 107 of the valve stem 105.

The press according to FIGS. 7 and 8 operates as follows:

First the plates 95 and 96 are, as described with reference to FIG. 6, brought relatively close together so that the bead seats with certainty against the tire beads. Next a relatively low pressure is let into the interior 98 of the tire through the feed pipe 108 whereby at the same time the plates 95 and 96 are brought to a distance that is greater than the distance that corresponds to the normal distance between the beads of the tire.

Next, the mold is closed. Shortly before the complete closing, the heads 107 of the tappet values 101 and 102 come into contact with the surfaces 109 and 110. whereby the valves are opened so that the interior 98 of the tire is connected through the passages 99 and 100 with the spaces 70 and 71. The final position of the plates is determined by adjustable stop screws 111 and 112. After opening the valves 101 and 102, the same pressure constantly prevails in the spaces 98 and 70 and 71 so that on both sides of the tire sidewalls, equal pressure prevails and the tire sidewalls are not subpected to stress. The contact of the mold rings 48 and 54 is nevertheless assured as the seal through the rounded edges 73 and 74 and the relief grooves 75 and 76 provides that no pressure can build up between the surface of the tire surrounded by the mold ring and the inside of the mold ring. After complete closing of the mold the pressure is sharly increased, namely to the pressure normally used for vulcanizing.

In FIG. 7 a tire 97 with relatively small bead-to-bead measurement is represented and in FIG. 8 a tire 113 with large bead-to-bead measurement. As equal pressure prevails in the spaces 98, 70 and 71 and the tire beads can detach themselves from their seats, as illustrated in FIG. 8.

I claim:

1. Apparatus for renewing the circular shape of vehicle tires comprising divided vulcanizing mold parts to lie against the tire essentially only in the area of its tread, the parts mold being mounted in a tire heating press, the mold parts being removable from each other, a device for supplying a pressure medium to the interior of the tire to press the tire against the mold parts, the mold parts having cavities in the area of the sidewalls into which a pressure medium can be introduced.

2. Apparatus according to claim 1, in which the tire heating press has bead seating rings therein movable in relation to the mold parts.

3. Apparatus according to claim 1, in which the tire heating press includes a curing bag which takes up the pressure medium that is conveyed into the interior of the tire.

4. Apparatus according to claim 1, in which the pressure medium can be introduced directly into the tire.

5. Apparatus according to claim 1, in which the cavities are provided in the area of the tire sidewalls bounded by membranes in the form of tubes which lie against the tire sidewalls.

6. Apparatus according to claim 1, in which cavities are open toward the tire sidewalls.

7. Apparatus according to claim 1, in which sealing beads are provided in the vicinity of the edge of the parts of the mold adjacent to the tire, and pressing themselves into the tire.

8. Apparatus according to claim 1, in which annular grooves are provided in the vicinity of the edge of the parts of the mold and are connected by channels with a lower pressure.

9. Apparatus according to claim 1, in which sealing beads are provided in the vicinity of the edge of the parts of the mold adjacent to the tire, and pressing themselves into the tire, the distance of the bead seating rings being adjustable in relation to the mold.

10. Apparatus according to claim 1, in which supply pipes are provided for the introduction of a pressure medium into the cavities adjacent to the tire sidewalls and are connected with the source for the pressure medium to be introduced into the interior of the tire.

11. Apparatus according to claim 1, in which supply pipes are provided for the introduction of a pressure medium into the cavities adjacent to the tire sidewalls and are connected with the source for the pressure medium to be introduced into the interior of the tire, and supply pipes to the said cavities being connected in series with a pressure reducing device which constantly maintains a uniform pressure difference between the supply pipe to the interior of the tire and the supply pipes to the cavities.

12. Apparatus according to claim 1, in which supply pipes are provided for the introduction of a pressure medium into the cavities adjacent to the tire sidewalls and are connected with the source for the pressure medium to be introduced into the interior of the tire, the supply pipes to the said cavities being connected in series with a pressure reducing device which constantly maintains a uniform pressure difference between the supply pipe to the interior of the tire and the supply pipes to the cavities, and the pressure reducing device having a valve with a control device which is influenced both by pressure in the supply pipe to the interior of the tire and by the pressure in the supply pipes to the cavities.

13. Apparatus according to claim 1, in which closing elements are provided for connecting passages between the interior of the tire and the cavities, and actuating means for opening the closing elements after the closing of the press.

14. Apparatus according to claim 1, in which closing elements are provided for connecting passages between the interior of the tire and the cavities, and actuating means for opening the closing elements after the closing of the press, the closing elements being disposed in the bead seating rings which are movable in relation to the mold halves, and the vulcanizing position of the bead seating rings being forced into the open position by contact with the mold.

15. Apparatus according to claim 1, in which closing elements are provided for connecting passages between the interior of the tire and the cavities, and actuating means for opening the closing elements after the closing of the press, the closing elements being constructed as spring loaded tappet valves which in the vulcanizing position of the press are in contact with the mold through their stem.

16. Apparatus for renewing the circular shape of vehicle tires with a divided vulcanizing mold which lies against the tire essentially only in the area of its tread, comprising a vulcanizing mold built into a tire heating press which has a moving mechanism by means of which mold parts can be moved away from each other, means in the press for the introduction of a pressure medium into the interior of the tire, said mold having cavities therein in the area of the sidewalls of the tire, and supply pipes for the introduction of a pressure medium into the said cavities.

References Cited
UNITED STATES PATENTS

| | | | |
|---|---|---|---|
| 2,835,921 | 5/1958 | White | 18—18F |
| 2,901,772 | 9/1959 | Frohlick et al. | 18—18F |
| 3,135,996 | 6/1964 | Smyser | 18—18F |
| 3,184,794 | 5/1965 | Sherkin | 18—18F |
| 3,516,121 | 6/1970 | Mattox et al. | 18—18F |

J. HOWARD FLINT, Jr., Primary Examiner

U.S. Cl. X.R.

18—17W